United States Patent
Hirner

[15] 3,669,902
[45] June 13, 1972

[54] DICYCLOHEXYLTHIOUREA CORROSION INHIBITOR COMPOSITION

[72] Inventor: Robert Eugene Hirner, Waukegan, Ill.

[73] Assignee: Abbott Laboratories, North Chicago, Ill.

[22] Filed: Sept. 22, 1970

[21] Appl. No.: 74,491

[52] U.S. Cl. ..........................252/391, 21/207, 252/8.55 C, 252/149, 252/390, 252/402, 252/395
[51] Int. Cl. .......................................C23f 11/16, C23g 1/06
[58] Field of Search.................252/391, 390, 8.55 C, 8.55 E, 252/149, 402, 392, 394, 395; 21/2.7; 106/14; 134/3

[56] References Cited

UNITED STATES PATENTS

| | | | |
|---|---|---|---|
| 2,071,966 | 2/1937 | Bolton | 252/149 |
| 3,047,510 | 7/1962 | Cizek | 252/391 |
| 3,188,292 | 6/1965 | Pirotte | 252/391 |
| 3,294,695 | 12/1965 | Tippett | 252/391 |
| 3,362,912 | 1/1968 | Chadwick et al. | 252/391 |

OTHER PUBLICATIONS

Chemical Abstracts, Vol. 58, 1963, p. 1,449 f: Vol. 56, 1962, p. 4,964 e.

*Primary Examiner*—Leon D. Rosdol
*Attorney*—Robert L. Niblack

[57] ABSTRACT

Dicyclohexylthiourea can be provided in a liquid composition ready for addition to an acid bath as a corrosion inhibitor. The highly insoluble dicyclohexylthiourea is compounded for this purpose with dimethylacetamide and a specific wetting agent.

2 Claims, No Drawings

DICYCLOHEXYLTHIOUREA CORROSION INHIBITOR COMPOSITION

DETAILED DESCRIPTION OF THE INVENTION

Dicyclohexylthiourea has recently been used for the inhibition of corrosion on carbon steels and aluminum; its use includes the addition thereof to pickling baths, to remove mill scale resulting from hot mill operations which must be removed before electroplating, galvanizing or coating of the metal surface; it is used in steel well topping in the oil industry and in many other industrial applications involving intimate contact between strong acids and metals. For these and numerous other industrial uses, it is highly desirable to have a liquid, water-soluble composition containing sufficient dicyclohexylthiourea to add significant amounts thereof to corrosive liquids.

Unfortunately, dicyclohexylthiourea is extremely insoluble in water and in many organic systems; it is however, soluble in chlorinated hydrocarbons such as methylene chloride, chloroform, carbon tetrachloride and the like but these solvents are not water miscible and cannot be used in aqueous acid baths or at elevated temperatures due to their toxicity. Without an organic solvent, dicyclohexylthiourea is soluble in acid baths at 4 to 6 parts per million, but greater concentrations often are desirable to protect the metal surface in contact therewith.

It is therefore an object of the present invention to provide a liquid composition containing dicyclohexylthiourea; it is another object of this invention to provide a water-soluble liquid containing dicyclohexylthiourea; it is a further important object of this invention to provide a liquid, water-soluble composition containing a high concentration of dicyclohexylthiourea which is stable to prolonged storage and compatible with mineral acids used in pickling baths.

These and other objects are accomplished by preparing a mixture of 45–55 parts of dimethlacetamide, 45–35 parts of the reaction product of t-octylphenol or t-nonylphenol with ethylene oxide containing between 5 and 15 ethylene oxide groups per molecule, and 10 parts of dicyclohexylthiourea. The above reaction product of t-alkyl-phenol and ethylene oxide is a non-ionic, surface-active agent of the formula

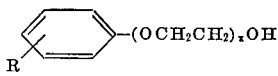

wherein R is t-nonyl or t-octyl and x is 5–15; they are often referred to as alkyl aryl polyether alcohols or alkyl phenyl ethers of polyethylene glycol.

The new composition is made by heating dimethylacetamide to 50°–60° C. and adding thereto the appropriate amount of dicyclohexylthiourea. Heating is continued with agitation until a clear solution is obtained at which time the above alkyl aryl polyether alcohol is added while keeping the temperature above 50° C. After the addition is complete, the clear solution is allowed to cool to room temperature under agitation. The new composition is stable to storage for long periods of time under normal conditions and can be used directly as an additive to corrosive liquids in order to protect any metal surfaces in direct contact with these corrosives.

In order to illustrate the preparation of the present invention, reference is made to the following examples which are not meant to limit the invention in any respect. In these examples and for the purpose of this disclosure, all "parts" and percentages are measured as parts or percent by weight.

EXAMPLES

A clean reactor was charged with 4,350 parts (48.5percent) of dimethylacetamide and 930 parts (10.1 percent) dicyclohexylthiourea. The mixture is agitated and heated to 50°–60 C. until a clear solution was obtained. At that time and under the same temperature conditions, 3,720 parts (41.4 percent of the final composition) of Triton X–100 (t-octylphenol/ethylene oxide condensation product with an average of 9–10 ethylene oxide groups; marketed by Rohm and Haas, Philadelphia). The temperature was maintained and agitating was continued for 1 hour at which time the solution was allowed to cool to room temperature under continued agitation. The solution was filtered before final packaging.

Individual samples of this solution were stored separately under various temperature conditions and found to be stable to storage. Samples were also added to an acid bath containing 10 percent hydrochloric acid and a separate bath containing 10 percent sulfuric acid. Both of these solutions were then heated to 60° C. and held at these temperatures for 1 hour prior to cooling to room temperature. No precipitate developed in either solution and the final assays of these solutions showed the theoretical amount of dicyclohexylthiourea within 5 percent.

When in the above example, Triton X–100 was replaced by Triton X–45, X–102, X–114, N–57 or N–101 (X stands for t-octylphenol and N stands for t-nonylphenol condensation products with ethylene oxide; the numbers indicate various degrees of ethylene oxide chain lengths), substantially the same results were obtained. More specifically, when using Triton X–45 ( 5 ethylene oxide links per molecule) in the above composition in place of X–100, a clear solution was obtained and after adding that solution to a standard pickling bath, no precipitate occurred for 3–4 days.

In a repetition of the above example, the identical ingredients were used but the amount of dimethylacetamide was increased to 55 parts and the amount of Triton X–100 was decreased to 35 parts per 10 parts of dicyclohexylthiourea; the same storage and acid stabilities were observed. In another repetition of the above example, the amount of dimethylacetamide was decreased to 45 parts and the amount of Triton X–100 increased to 45 parts per 10 parts of dicyclohexylthiourea, producing identical results in solution stability.

The above composition represents a surprising and valuable finding since only the particular choice of surface active agent and solvent produces a stable, clear solution containing at least 10 percent by weight of dicyclohexylthiourea. Other solvents, including the closely related dimethylformamide and other wetting agents cannot be substituted for this purpose. Also, the proportions of the above ingredients must carefully be selected within the above limits: if more than 55 percent of dimethylacetamide is used, the composition is not stable to storage; when the amount of wetting agent is increased beyond 45 percent by weight, dicyclohexylthiourea cannot be dissolved to the necessary and desirable concentration of 10 percent by weight of the final composition.

I claim:

1. A composition consisting essentially of 45–55 parts by weight of dimethylacetamide, 10 parts by weight of dicyclohexylthiourea and 45 to 35 parts by weight of the condensation product between ethylene oxide and t-octyl or t-nonylphenol containing between 5 and 15 ethylene oxide groups per molecule.

2. The composition of claim 1 wherein said condensation product averages between 7 and 8 ethylene oxide groups per molecule.